(12) United States Patent
Takesue et al.

(10) Patent No.: US 6,894,097 B2
(45) Date of Patent: May 17, 2005

(54) GOLF BALL MATERIAL AND GOLF BALL

(75) Inventors: Rinya Takesue, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/994,729

(22) Filed: Nov. 28, 2001

(65) Prior Publication Data

US 2002/0111407 A1 Aug. 15, 2002

(30) Foreign Application Priority Data

Dec. 13, 2000 (JP) ........................................ 2000-379247

(51) Int. Cl.⁷ .......................... A63B 37/12; C08L 33/02; C08K 5/09
(52) U.S. Cl. ...................... 524/322; 524/400; 473/385
(58) Field of Search .............................. 524/322, 400; 473/385

(56) References Cited

U.S. PATENT DOCUMENTS

| | | | |
|---|---|---|---|
| 3,404,134 A | 10/1968 | Rees | |
| 3,959,539 A | 5/1976 | Waggoner | |
| 4,526,375 A | 7/1985 | Nakade | |
| 4,984,804 A | 1/1991 | Yamada et al. | |
| 4,999,404 A | 3/1991 | Matsuki | |
| 5,019,320 A | 5/1991 | Hasegawa et al. | |
| 5,306,760 A | 4/1994 | Sullivan | |
| 5,312,857 A | 5/1994 | Sullivan | |
| 5,439,227 A | 8/1995 | Egashira et al. | |
| 5,559,188 A | 9/1996 | Egashira et al. | |
| 5,605,968 A | 2/1997 | Egashira et al. | |
| 5,779,561 A | 7/1998 | Sullivan et al. | |
| 5,803,831 A | 9/1998 | Sullivan et al. | |
| 5,824,740 A | 10/1998 | Yabuki et al. | |
| 5,902,855 A | 5/1999 | Sullivan | |
| 5,929,189 A | 7/1999 | Ichikawa et al. | |
| 5,948,859 A | 9/1999 | Sano et al. | |
| 5,994,470 A | 11/1999 | Tanaka et al. | |
| 6,018,003 A | 1/2000 | Sullivan et al. | |
| 6,034,182 A | 3/2000 | Kashiwagi et al. | |
| 6,100,321 A | 8/2000 | Chen | |
| 6,130,294 A | 10/2000 | Ichikawa et al. | |
| 6,319,153 B1 | 11/2001 | Nesbitt et al. | |
| 6,325,731 B1 | 12/2001 | Kennedy, III et al. | |
| 6,329,458 B1 | 12/2001 | Takesue et al. | |
| 6,565,455 B2 * | 5/2003 | Hayashi et al. ............. 473/371 |
| 6,653,382 B1 | 11/2003 | Statz et al. | |
| 2001/0018375 A1 | 8/2001 | Hayashi et al. | |
| 2002/0055400 A1 * | 5/2002 | Higuchi | |
| 2002/0061793 A1 * | 5/2002 | Higuchi | |
| 2003/0130434 A1 * | 7/2003 | Statz et al. ............. 525/329.5 |

FOREIGN PATENT DOCUMENTS

| | | |
|---|---|---|
| GB | 1113409 | 5/1968 |
| JP | 5-3931 | 1/1993 |
| JP | 9-117532 | 5/1997 |
| JP | 9-313643 | 12/1997 |
| JP | 10-305114 | 11/1998 |
| WO | WO 98/46671 | 10/1998 |
| WO | WO 00/23519 A1 | 4/2000 |
| WO | WO 01/29129 A1 | 4/2001 |

OTHER PUBLICATIONS

Database WPI, Section Ch, Week 200055, Derwent Publications Ltd., London, GB; Class A17, AN 2000–581382 XP002191827.

Database WPI, Section Ch, Week 200039, Derwent Publications Ltd., London, GB; Class H07, AN 2000–443217 XP002191828.

European Search Report dated Mar. 14, 2002.

* cited by examiner

*Primary Examiner*—David J. Buttner
(74) *Attorney, Agent, or Firm*—Sughrue Mion, PLLC

(57) ABSTRACT

A mixture having good thermal stability, flow and moldability and suitable as a golf ball-forming material is obtained when a base resin comprising a (metal ion-neutralized) olefin-unsaturated carboxylic acid-unsaturated carboxylate ternary random copolymer and optionally a (metal ion-neutralized) olefin-unsaturated carboxylic acid binary random copolymer is blended with specific proportions of a fatty acid and/or fatty acid derivative and a basic inorganic metal compound capable of neutralizing acidic groups left unneutralized in the base resin and fatty acid. Using the same material, high-rebound golf balls can be effectively manufactured.

17 Claims, No Drawings

GOLF BALL MATERIAL AND GOLF BALL

The present invention relates to golf ball materials which have good thermal stability, flow characteristics and moldability, and which are capable of providing high-performance golf balls endowed with outstanding rebound energy. The invention relates also to golf balls made with such golf ball materials.

BACKGROUND OF THE INVENTION

Over the past few years, wide use has been made of ionomer resins in golf ball cover materials, also referred to hereinafter as "cover stock". Ionomer resins are ionic copolymers composed of an olefin such as ethylene in combination with an unsaturated carboxylic acid such as acrylic acid, methacrylic acid or maleic acid, wherein the acidic groups are partially neutralized with metal ions such as sodium, lithium, zinc or magnesium ions. They have excellent characteristics such as durability, resilience and scuff resistance.

Ionomer resins account for most of the cover stock resin in current use. A variety of improvements have been made thereon because golfers are always on the lookout for golf balls having a high rebound and excellent flight characteristics.

Related improvements taught by the prior art (see U.S. Pat. No. 5,312,857, U.S. Pat. No. 5,306,760, and International Application WO 98/46671) include cover stock in which a large amount of metallic soap is added to the ionomer resin to improve the cost and rebound characteristics of the ionomer cover stock.

These cover stocks, however, fall far short of practical levels. During injection molding, the metallic soap in the cover stock decomposes and vaporizes to generate a large amount of fatty acid gas, often causing molding defects. In addition, gas constituents settle on the surface of the molded part to considerably lower the paintability thereof. Moreover, although such cover stock in which a large amount of metallic soap has been added to the ionomer resin does exhibit a rebound which is about the same as or better than that of metallic soap-free ionomer cover stock having the same degree of hardness, the improvement in rebound is not all that large. Indeed, depending on the type of metallic soap used, the moldability and rebound of cover stock may in fact be severely compromised.

SUMMARY OF THE INVENTION

Therefore, one object of the invention is to provide golf ball materials which have good thermal stability, flow and moldability, and which are capable of producing golf balls with outstanding rebound. Another object of the invention is to provide golf balls made using such golf ball materials.

Quite unexpectedly, it has been found that a mixture having good thermal stability, flow and moldability is obtained when 100 parts by weight of a base resin having (a) an olefin-unsaturated carboxylic acid binary random copolymer and/or a metal ion-neutralized olefin-unsaturated carboxylic acid binary random copolymer blended with (b) an olefin-unsaturated carboxylic acid-unsaturated carboxylate ternary random copolymer and/or a metal ion-neutralized olefin-unsaturated carboxylic acid-unsaturated carboxylate ternary random copolymer in a weight ratio of 0:100 to 30:70 is blended with (c) 5 to 80 parts by weight of a fatty acid and/or fatty acid derivative having a molecular weight of 280 to 1,500 and (d) 0.1 to 10 parts by weight of a basic inorganic metal compound capable of neutralizing acidic groups left unneutralized in the base resin and component (c). The mixture is suitable for molding and a molded part thereof exhibits improved rebound characteristics.

The molded part of the above-described golf ball material can form any desired constituent component of a golf ball (which is selected from among a one-piece golf ball, solid core, solid center, cover and other components). The golf ball thus constructed has very good rebound and improved initial velocity performance. The invention is predicated on these findings.

According to the invention, there is provided a golf ball material comprising a mixture which is composed of essential components:

100 parts by weight of a base resin having (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion-neutralized olefin-unsaturated carboxylic acid-unsaturated carboxylate ternary random copolymer in a weight ratio of 0:100 to 30:70, (c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c).

In a preferred embodiment, the mixture when molded has a Shore D hardness of 30 to 60; the mixture has a melt index of 0.5 to 20 dg/min.; the metal ion-neutralized random copolymer in the base resin includes a zinc ion-neutralized ionomer resin. The total content of random copolymers and the total content of metal ion-neutralized random copolymers in the base resin are preferably in a weight ratio of 0:100 to 60:40. Component (c) is typically selected from among stearic acid, behenic acid, arachidic acid, lignoceric acid and derivatives thereof. Typically, component (d) is calcium hydroxide.

In another aspect, the invention provides a golf ball comprising a molded part of the golf ball material set forth above as a constituent component.

DETAILED DESCRIPTION OF THE INVENTION

The golf ball material of the invention contains as an essential component a base resin having (a) an olefin-unsaturated carboxylic acid binary random copolymer and/or a metal ion-neutralized olefin-unsaturated carboxylic acid binary random copolymer blended with (b) an olefin-unsaturated carboxylic acid-unsaturated carboxylate ternary random copolymer and/or a metal ion-neutralized olefin-unsaturated carboxylic acid-unsaturated carboxylate ternary random copolymer in a specific weight ratio.

In the base resin, the olefin, whether it belongs to component (a) or (b), generally has at least 2 carbon atoms, but not more than 8 carbon atoms, and preferably not more than 6 carbon atoms. Illustrative examples include ethylene, propylene, butene, pentene, hexene, heptene and octene. Ethylene is especially preferred.

Suitable examples of the unsaturated carboxylic acid include acrylic acid, methacrylic acid, maleic acid and fumaric acid. Of these, acrylic acid and methacrylic acid are especially preferred.

The unsaturated carboxylate is preferably a lower alkyl ester of the foregoing unsaturated carboxylic acid. Illustrative examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin-unsaturated carboxylic acid binary random copolymer (a) or olefin-unsaturated carboxylic acid-unsaturated carboxylate ternary random copolymer (b), to be commonly referred to as "random copolymer" hereinafter, may be prepared by furnishing the above ingredients and carrying out random copolymerization in a well-known manner.

It is recommended that the unsaturated carboxylic acid content (simply referred to as acid content) within the random copolymer be adjusted to an appropriate level. For the random copolymer (a), an appropriate acid content is at least 4%, preferably at least 6%, more preferably at least 8%, and most preferably at least 10% by weight, but not more than 30%, preferably not more than 20%, more preferably not more than 18%, and most preferably not more than 15% by weight. For the random copolymer (b), an appropriate acid content is at least 4%, preferably at least 6%, and more preferably at least 8% by weight, but not more than 15%, preferably not more than 12%, and more preferably not more than 10% by weight. Outside the range, a lower acid content may lower resilience, whereas a higher acid content may lower processability.

The metal ion-neutralized olefin-unsaturated carboxylic acid binary random copolymer (a) or metal ion-neutralized olefin-unsaturated carboxylic acid-unsaturated carboxylate ternary random copolymer (b), to be commonly referred to as "neutralized random copolymer" hereinafter, may be prepared by partially neutralizing acid groups in the above-mentioned random copolymer with metal ions.

Examples of the metal ions for neutralizing acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. The use of ions such as $Na^+$, $Li^+$, $Zn^{2+}$ and $Mg^{2+}$ is preferred. $Zn^{2+}$ is especially preferred.

Such neutralized random copolymers are prepared by neutralizing the above-mentioned random copolymer with the foregoing metal ions. For example, the random copolymers can be neutralized using formates, acetates, nitrates, carbonates, hydrogencarbonates, oxides, hydroxides or alkoxides of the metal ions. The degree of random copolymer neutralization with the metal ions is not critical.

Of the neutralized random copolymers, a zinc ion-neutralized ionomer resin is preferred because it allows the mixture to be increased in melt index to an appropriate level to mold the material.

The base resin consisting of components (a) and (b) may be obtained using commercially available resins. For example, the random copolymer (a) is commercially available under the trade name of Nucrel 1560, 1214 and 1035 from DuPont-Mitsui Polychemicals Co., Ltd. and ESCOR 5200, 5100 and 5000 from EXXONMOBIL Chemical. The random copolymer (b) is commercially available under the trade name of Nucrel AN4311 and AN4318 from DuPont-Mitsui Polychemicals Co., Ltd. and ESCOR ATX325, ATX320 and ATX310 from EXXONMOBIL Chemical.

Also the neutralized random copolymer (a) is commercially available under the trade name of Himilan 1554, 1557, 1601, 1605, 1706 and AM7311 from DuPont-Mitsui Polychemicals Co., Ltd., Surlyn 7930 from E. I. Dupont, and Iotek 3110 and 4200 from EXXONMOBIL Chemical. The neutralized random copolymer (b) is commercially available under the trade name of Himilan 1855, 1856, and AM7316 from DuPont-Mitsui Polychemicals Co., Ltd., Surlyn 6320, 8320, 9320 and 8120 from E. I. Dupont, and Iotek 7510 and 7520 from EXXONMOBIL Chemical. Zinc-neutralized ionomer resins such as Himilan 1706, 1855 and AM7316 and Surlyn 9320 are especially preferred among the neutralized random copolymers.

The base resin is prepared by blending components (a) and (b) in a weight ratio between 0:100 and 30:70, preferably 0:100 and 20:80, more preferably 0:100 and 10:90, and most preferably 0:100. An improved feel on hitting is obtainable by adjusting the blending proportion of base resin components.

The base resin consisting of components (a) and (b) can also be tailored for effective molding by adjusting the blend ratio of the random copolymer and the neutralized random copolymer as well as the above-adjusted proportion of components (a) and (b). It is recommended that the random copolymer and the neutralized random copolymer be blended in a weight ratio between 0:100 and 60:40, preferably 0:100 and 40:60, more preferably 0:100 and 20:80, and most preferably 0:100. With too high a proportion of the random copolymer, the material may become difficult to mix and mold.

In the inventive mixture, component (c) is a fatty acid or fatty acid derivative having a molecular weight of 280 to 1,500 whose purpose is to enhance the flow characteristics of the mixture. It has a molecular weight which is much smaller than that of the base resin, and serves to increase the melt viscosity of the mixture to an appropriate level. Also, because the fatty acid or fatty acid derivative has a high content of acid groups or derivative moieties thereof, its addition to the mixture precludes a substantial loss of rebound.

The molecular weight of fatty acid or fatty acid derivative (c) is at least 280, preferably at least 300, more preferably at least 330, and most preferably at least 360 and up to 1,500, preferably up to 1,000, more preferably up to 600, and most preferably up to 500. Too low a molecular weight fails to improve heat resistance whereas too high a molecular weight fails to improve flow.

The fatty acid or fatty acid derivative (c) may be an unsaturated fatty acid or derivative thereof having a double bond or triple bond in the alkyl group, or it may be a saturated fatty acid or derivative thereof in which all the bonds on the alkyl group are single bonds. It is recommended that the number of carbon atoms on the molecule generally be at least 18, preferably at least 20, more preferably at least 22, and even more preferably at least 24, but up to 80, preferably up to 60, more preferably up to 40, and even more preferably up to 30. Too few carbons may make it impossible to achieve the improved heat resistance, and may also set the acid group content so high as to cause the acid groups to interact with acid groups present on the base resin, diminishing the flow-improving effects. On the other hand, too many carbons increases the molecular weight, which may also lower the flow-improving effects.

Examples of fatty acids (c) include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred, with behenic acid being most preferred.

Fatty acid derivatives which may be used as component (c) include metallic soaps in which the proton on the acid group of the fatty acid has been substituted with a metal ion. Metal ions that may be used in such metallic soaps include $Na^+$, $Li^+$, $Ca^{2+}$, $Mg^{2+}$, $Zn^{2+}$, $Mn^{2+}$, $Al^{3+}$, $Ni^{2+}$, $Fe^{2+}$, $Cu^{2+}$, $Sn^{2+}$, $Pb^{2+}$ and $Co^{2+}$. Of these, $Ca^{2+}$, $Mg^{2+}$ and $Zn^{2+}$ are especially preferred.

Examples of the fatty acid derivatives (c) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

In the practice of the invention, use may also be made of known metallic soap-modified ionomer resins, including those described in U.S. Pat. No. 5,312,857, U.S. Pat. No. 5,306,760 and WO 98/46671, as a combination of the base resin (consisting of components (a) and (b)) with component (c).

The golf ball material of the invention includes as essential component (d) a basic inorganic metal compound capable of neutralizing the acid groups in the base resin and component (c). As already noted in the preamble, heating and mixing only a metal soap-modified ionomer resin free of component (d) (e.g., only a metallic soap-modified ionomer resin of the type described in the above-cited patents) results in formation of a large amount of fatty acid due to an exchange reaction between the metallic soap and unneutralized acid groups on the ionomer resin, as shown below. This causes molding defects because the fatty acid thus formed is thermal unstable and readily vaporizes during molding. In addition, the fatty acid thus formed settles on the surface of the molded part, substantially lowering the ability of a paint film to adhere thereto.

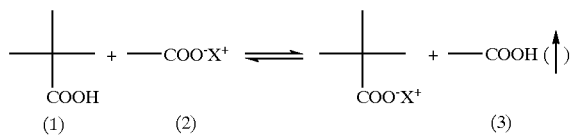

Here, (1) is an unneutralized acid group present on the ionomer resin, (2) is a metallic soap, (3) is a fatty acid, and X is a metal atom.

In order to resolve such problems, the present invention incorporates as component (d) a basic inorganic metal compound which neutralizes the acid groups present in the base resin and in component (c), thereby yielding a golf ball material having outstandingly improved rebound properties due to the synergistic cooperation of these components. Incorporating essential component (d) serves to neutralize the acid groups in the base resin and in component (c) to an appropriate extent. These components, when blended together in an optimum proportion, act synergistically to increase the thermal stability of the mixture, impart good moldability and enhance rebound characteristics.

It is recommended that the basic inorganic metal compound (d) be highly reactive with the base resin to form reaction by-products which are free of organic acid so that the degree of neutralization of the mixture may be increased without detracting from thermal stability.

Exemplary metal ions that can be used in the basic inorganic metal compound (d) include $Li^+$, $Na^+$, $K^+$, $Ca^{2+}$, $Mg^{2+}$, $Zn^{2+}$, $Al^{3+}$, $Ni^{2+}$, $Fe^{2+}$, $Fe^{3+}$, $Cu^{2+}$, $Mn^{2+}$, $Sn^{2+}$, $Pb^{2+}$ and $Co^{2+}$. Examples of the basic inorganic metal compound include well-known basic inorganic fillers containing these metal ions, such as magnesium oxide, magnesium hydroxide, magnesium carbonate, zinc oxide, sodium hydroxide, sodium carbonate, calcium oxide, calcium hydroxide, lithium hydroxide and lithium carbonate. Of these, hydroxides and monoxides are preferred. Inter alia, calcium hydroxide and magnesium oxide, especially calcium hydroxide, are preferred since they are more reactive with the base resin.

The inventive golf ball material comprising, as described above, a base resin consisting of a specific proportion of components (a) and (b), in admixture with specific proportions of component (c) and component (d) has improved thermal stability, flow and moldability, and endows a molded part with outstanding rebound characteristics. It is critical that the components (c) and (d) be compounded in relative proportions per 100 parts by weight of the base resin consisting of components (a) and (b); at least 5 parts, preferably at least 10 parts, more preferably at least 15 parts, and most preferably at least 18 parts by weight, but not more than 80 parts, preferably not more than 40 parts, more preferably not more than 25 parts by weight, and most preferably not more than 22 parts by weight, of component (c); and at least 0.1 part, preferably at least 0.5 part, more preferably at least 1 part, and most preferably at least 2 parts by weight, but not more than 10 parts, preferably not more than 8 parts, more preferably not more than 6 parts, and most preferably not more than 5 parts by weight, of component (d). Too little component (c) lowers the melt viscosity, resulting in inferior processability, whereas too much detracts from the durability. Too little component (d) fails to improve thermal stability and rebound, whereas too much component (d) instead lowers the heat resistance of the material due to the excess of basic inorganic metal compound.

While the golf ball material of the invention is arrived at by mixing the base resin with components (c) and (d), it is recommended that at least 60 mol %, preferably at least 70 mol %, more preferably at least 80 mol %, and most preferably at least 90 mol %, of the acid groups in the mixture be neutralized. Such a high degree of neutralization makes it possible to more reliably suppress the exchange reaction which becomes a problem when only the above-described base resin and the fatty acid or fatty acid derivative are used as in the prior art, and thus prevents the formation of fatty acid. As a result, there can be obtained a material having greatly increased thermal stability, good moldability and a much larger resilience than prior-art ionomer resins.

It is noted that the degree of neutralization refers to the degree of neutralization of acid groups in the mixture of the base resin and the fatty acid or derivative thereof (c) rather than the degree of neutralization of an ionomer resin itself which is used as the neutralized random copolymer in the base resin. When the inventive mixture is compared with an ionomer resin alone having an identical degree of neutralization, the mixture contains much more metal ions. Then the mixture, when molded, arrives at a higher density of ionic crosslinks contributing to resilience improvement, with a molded part being endowed with greater resilience.

To more reliably achieve both a high degree of neutralization and smooth flow, it is recommended that the acid groups in the mixture be neutralized with transition metal ions and alkali metal and/or alkaline earth metal ions. Although transition metal ions have weaker ionic cohesion than alkali metal and alkaline earth metal ions, the combined use of metal ions of different species to neutralize the acid groups in the mixture can provide a substantial improvement in flow.

It is recommended that the molar ratio between the transition metal ions and the alkali metal and/or alkaline earth metal ions fall in the range of from 10:90 to 90:10, preferably from 20:80 to 80:20, more preferably from 30:70 to 70:30, and most preferably from 40:60 to 60:40. Too low a molar ratio of transition metal ions may fail to provide sufficient improvement in flow, whereas too high a molar ratio may lower resilience.

Illustrative, non-limiting examples of the metal ions include zinc ions as the transition metal ions, and at least one type of ion selected from among sodium ions, lithium ions and magnesium ions as the alkali metal or alkaline earth metal ions.

Any known method may be used in obtaining a mixture in which the desired proportion of the acid groups have been neutralized with transition metal ions and alkali metal or alkaline earth metal ions. For example, specific methods of neutralization with transition metal ions, and in particular zinc ions, include the use of zinc soap as the fatty acid derivative, the inclusion of a zinc-neutralized random copolymer (e.g., zinc-neutralized ionomer resin) as components (a) and (b) in the base resin, and the use of a zinc compound, typically zinc oxide, as the basic inorganic metal compound (d).

The golf ball material of the invention can be prepared for a particular application by incorporating in the above-described mixture of essential components whatever additives may be required. For example, where the material is to be used as a cover stock, the mixture may have added thereto such additives as pigments, dispersants, antioxidants, ultraviolet absorbers and light stabilizers. Where such additives are compounded, the addition amount is preferably at least 0.1 part, more preferably at least 0.5 part, and even more preferably at least 1 part by weight and up to 10 parts, more preferably up to 6 parts, and even more preferably up to 4 parts by weight, per 100 parts by weight of the essential components (base resin+(c)+(d)) combined.

In the golf ball material of the invention, a thermoplastic elastomer other than the ionomer resins may be compounded with the above-mentioned essential components in order to improve the hitting feel. Illustrative examples of the non-ionomer thermoplastic elastomer include olefin elastomers, styrene elastomers, polyester elastomers, urethane elastomers, and polyamide elastomers. Of these, olefin elastomers and polyester elastomers are preferred. The amount of the non-ionomer thermoplastic elastomer, when added, is preferably at least 1 part, more preferably at least 2 parts, even more preferably at least 3 parts, most preferably at least 4 parts by weight and up to 100 parts, more preferably up to 60 parts, even more preferably up to 40 parts, most preferably up to 20 parts by weight, per 100 parts by weight of the essential components (base resin+(c)+(d)) combined.

The golf ball material of the invention can be arrived at by furnishing a mixture of the above-described essential components and optional components. For instance, necessary ingredients are heated and mixed at a heating temperature of 150 to 250° C. and in an internal mixer such as a kneading-type twin-screw extruder, a Banbury mixer or a kneader. Any desired method may be used to incorporate various additives together with the essential components in the golf ball material of the invention. For example, the additives may be blended with the essential components, and heating and mixing of all the ingredients carried out at the same time. Alternatively, the essential components may be pre-heated and pre-mixed, following which the optional additives may be added and the overall composition subjected to additional heating and mixing.

The golf ball material of the invention is preferably adjusted to an appropriate melt flow rate to provide an adequate flow for injection molding, that is, to improve moldability. It is recommended that the melt flow rate (MFR) of the material, as measured in accordance with JIS-K7210 at a temperature of 190° C. and under a load of 21.18 N (2.16 kgf), be at least 0.5 dg/min, preferably at least 1 dg/min, more preferably at least 1.5 dg/min, and most preferably at least 2.0 dg/min and not more than 20 dg/min, preferably not more than 10 dg/min, more preferably not more than 5 dg/min and most preferably not more than 3 dg/min. If the mixture has too low or too high a melt flow rate, the processability may decrease markedly.

The golf ball material of the invention is preferably optimized in the relative absorbance in infrared absorption spectroscopy, representing the ratio of absorbance at the absorption peak attributable to carboxylate anion stretching vibrations normally detected at 1530 to 1630 $cm^{-1}$ to the absorbance at the absorption peak attributable to carbonyl stretching vibrations normally detected at 1690 to 1710 $cm^{-1}$. For the sake of clarity, this ratio may be expressed as: (absorbance of absorption peak for carboxylate stretching vibrations)/(absorbance of absorption peak for carbonyl stretching vibrations).

Here, "carboxylate stretching vibrations" refers to vibrations by carboxyl groups from which the proton has dissociated (metal ion-neutralized carboxyl groups), whereas "carbonyl stretching vibrations" refers to vibrations by undissociated carboxyl groups. The ratio in these respective peak intensities depends on the degree of neutralization. For commonly used ionomer resins having a degree of neutralization of about 50 mol %, the ratio between these peak absorbances is about 1:1.

To improve the thermal stability, flow, moldability and rebound of the golf ball material, it is recommended that the material have a carboxylate stretching vibration peak absorbance which is at least 1.3 times, preferably at least 1.5 times, and more preferably at least 2 times, the carbonyl stretching vibration peak absorbance. The absence of a carbonyl stretching vibration peak altogether is especially preferred.

The thermal stability of the inventive golf ball material can be measured by thermogravimetry. It is recommended that, in thermogravimetric analysis, the mixture have a weight loss at 250° C., based on the weight of the mixture at 25° C., of not more than 2% by weight, preferably not more than 1.5% by weight, and most preferably not more than 1% by weight.

It is further recommended that the compounding of the golf ball material be adjusted so as to provide a molded part thereof with a Shore D hardness of at least 30, preferably at least 40, more preferably at least 45, even more preferably at least 50, but up to 60, preferably up to 58, more preferably up to 56, even more preferably up to 54. Too high a Shore D hardness may compromise the feel of a golf ball made of the material when hit whereas too low a Shore D hardness may lead to a decline of resilience.

The golf ball material may have any desired specific gravity although it is generally advisable for the specific gravity to be at least 0.9, more preferably at least 0.92, even more preferably at least 0.94, but not more than 1.2, more preferably not more than 1.1, even more preferably not more than 1.05.

The golf ball of the invention has a molded part of the golf ball material according to the invention as a constituent component. The layer or layers made of the golf ball material may constitute a portion or all of the golf ball. The inventive golf balls may be thread-wound balls, including those in which the cover has a single-layer or a multiple-layer construction, one-piece balls, two-piece balls, three-piece balls, or multi-piece balls having a cover composed of three or more layers. The type of golf ball is not critical as long as the ball has a molded part of the inventive golf ball material as a constituent component.

The inventive golf balls may be manufactured by preparing various mixtures for making one-piece balls, the solid centers of thread-wound golf balls, the solid cores of solid golf balls, or cover stock (for at least one layer in cores and covers composed of two or more layers) in accordance with the above-described golf ball material formulation of the invention, then using the mixture in accordance with a golf ball manufacturing method known to the art.

When the cover of a golf ball is made of the golf ball material according to the present invention, the core may be either a thread-wound core or a solid core and may be produced by a conventional method.

For example, a solid core may be produced by preparing a rubber composition composed of 100 parts by weight of cis-1,4-polybutadiene; from 10 to 60 parts by weight of one or more vulcanizing or crosslinking agents selected from among $\alpha,\beta$-monoethylenically unsaturated carboxylic acids (e.g., acrylic acid, methacrylic acid) or metal ion-neutralized compounds thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The resulting rubber composition can be formed into a solid spherical core by press vulcanization to effect crosslinkage, followed by compression under heating at 140 to 170° C. for a period of 10 to 40 minutes.

Production of a thread-wound golf ball core may be carried out using either a liquid or a solid center. In the case of a liquid center, a hollow spherical center envelope may be formed from the above-described rubber composition, for example, and a liquid filled into this envelope by a well-known method. If a solid center is used instead, the solid center may be produced by the solid core production method described above. Thereafter, rubber thread is wound in a stretched state about the center to form the core. Use may be made of rubber thread produced by a conventional method. For example, rubber thread is prepared by compounding natural rubber or synthetic rubber such as polyisoprene with various additives (e.g., antioxidants, vulcanization accelerators and sulfur) to form a rubber composition, which is molded and vulcanized.

The golf balls using the various types of cores described above and falling within the scope of the invention can be produced by forming the cover from the inventive golf ball material. In one such method, a single-layer or multi-layer core prefabricated according to the type of ball to be manufactured is placed in a mold, and the inventive material is heated, mixed and melted, then injection-molded over the core. In this case, the golf ball manufacturing operation can be carried out under conditions which assure that the material maintain excellent thermal stability, flow and moldability. The resulting golf ball has a high rebound.

The method used to produce the cover is not limited to the method described above. In an alternative method which can be used herein, a pair of hemispherical cups is molded from the inventive golf ball material, following which the cups are placed over a core and molded under heat (120 to 170° C.) and pressure for 1 to 5 minutes.

No particular limitation is imposed on the thickness of the cover made of the inventive material, although the cover is generally formed to a thickness of at least 0.5 mm, preferably at least 0.9 mm, more preferably at least 1.1 mm, but up to 3 mm, preferably up to 2.5 mm, more preferably up to 2.3 mm. The cover in the golf balls of the invention is not limited to one layer, and may instead have a multilayer construction of two or more layers. If the cover has a multilayer construction, the golf ball material of the invention may be used either at the interior of the multilayer construction or as the outermost layer of the cover. In the case of a single-layer cover (for two-piece golf ball), it is highly advantageous for the inventive material to serve as the cover material. If the ball is a multi-piece golf ball having a cover of two or more layers, the inventive material is most preferably used as a layer of the cover other than the outermost layer—that is, as an inner layer of the cover. In this embodiment, the cover outermost layer is preferably formed of an ionomer resin.

The golf ball may have a plurality of dimples formed on its surface, and the cover may be administered various treatment such as surface preparation, stamping and painting. In particular, a golf ball cover made of the inventive material ensures ease of work involved in administering such surface treatment.

The golf ball of the invention may be a golf ball in which the inventive golf ball material is used other than as the cover stock described above. For example, it may be a golf ball arrived at by using the inventive material as a one-piece golf ball material or as a core material. In this case, production may be carried out using well-known methods.

In the golf balls manufactured as described above, the diameter, weight, hardness and other parameters of the cover, solid or liquid center, solid core or thread-wound core, and one-piece golf balls, while not subject to any particular limitations, may be adjusted as appropriate, insofar as the objects of the invention are attainable.

The golf ball of the invention may be manufactured for use in tournaments by giving it a diameter and weight which conform with the Rules of Golf. That is, the ball may be produced to a diameter of not less than 42.67 mm and a weight of not greater than 45.93 g.

EXAMPLE

Examples of the invention and comparative examples are given below by way of illustration, and are not intended to limit the invention.

Examples 1–7 and Comparative Examples 1–7

Using a core material composed primarily of cis-1,4-polybutadiene, a solid core was produced having a diameter of 38.6 mm, a weight of 35.1 g, and a deflection of 3.1 mm under a load of 980 N (100 kg).

Cover materials of the compositions shown in Tables 1 and 2 were mixed at 230° C. with a kneading-type twin-screw extruder and prepared in the form of pellets. In each of the examples, the cover material was injected into a mold in which the solid core prepared above had been placed, giving a two-piece solid golf ball having a diameter of 42.8 mm and a cover thickness of 2.1 mm.

Example 8 and Comparative Examples 8 and 9

Using a core material composed primarily of cis-1,4-polybutadiene, a solid core was produced having a diameter of 36.4 mm, a weight of 30.9 g, and a deflection of 3.9 mm under a load of 980 N (100 kg).

In Example 8, the cover material described above in Example 1 was injection-molded over the core so as to form a cover inner layer having a thickness of 1.7 mm. Similarly, in Comparative Examples 8 and 9, the respective cover materials described in Comparative Examples 1 and 2 were injection-molded over the core so as to form a cover inner layer having a thickness of 1.7 mm. Next, in each of the three examples, the outer cover material shown in Table 3 was injection-molded over the cover inner layer, thereby giving a three-piece solid golf ball having a diameter of 42.8 mm.

The following characteristics were measured or evaluated for the golf balls obtained in each of the above examples. The results are also shown in Tables 1 to 3.

Ball Hardness:

Measured as the deflection (in millimeters) of the ball under an applied load of 980 N (100 kg).

Initial Velocity:

Measured using the same type of initial velocity instrument as that approved by the United States Golf Association (USGA), and in accordance with USGA rules. Relative Absorbance of Carboxylate Absorption Peak:

A transmission method was used to measure the infrared absorption of the samples. In the infrared absorption spectrum for a sample prepared to such a thickness as to make the peak transmittance associated with hydrocarbon chains observed near 2900 cm$^{-1}$ about 90%, the absorption peak due to carbonyl stretching vibrations (1690 to 1710 cm$^{-1}$) was assigned an absorbance value of 1 and the ratio thereto of the absorption peak due to carboxylate anion strength vibrations (1530 to 1630 cm$^{-1}$) was computed as the relative absorbance.

Percent Weight Loss:

Prior to measurement, samples were dried in a dry hopper at 50° C. for 24 hours for eliminating the influence of moisture. Thermogravimetric analysis was carried out on approximately 5 mg samples by raising the temperature from 25° C. to 300° C. in a nitrogen atmosphere (flow rate, 100 ml/min) at a rate of 10° C./min, then calculating the percent loss in the sample weight at 250° C. relative to the sample weight at 25° C.

Melt Flow Rate:

The melt flow rate of the material was measured in accordance with JIS-K7210 at a temperature of 190° C. and under a load of 21.18 N (2.16 kgf).

Extrudability:

Each of the cover materials was worked at 200° C. in an intermeshing co-rotating type twin-screw extruder (screw diameter, 32 mm; main motor output, 7.5 kW) such as is commonly used for mixing materials, whereupon it was rated for processability as follows.

Good: Extrudable
  Poor: Cannot be extruded due to excess loading Trade names and materials mentioned in the tables are described below.

Nucrel 1560: Ethylene-methacrylic acid copolymer made by DuPont-Mitsui Polychemicals Co., Ltd. Acid content, 15 wt %.

Himilan 1605: Sodium neutralized ethylene-methacrylic acid copolymer made by DuPont-Mitsui Polychemicals Co., Ltd.

Himilan 1706: Zinc neutralized ethylene-methacrylic acid copolymer made by DuPont-Mitsui Polychemicals Co., Ltd.

Nucrel AN4318: Ethylene-methacrylic acid-acrylate copolymer made by DuPont-Mitsui Polychemicals Co., Ltd. Ester content, 17 wt %.

Surlyn 8320: Sodium neutralized ethylene-methacrylic acid-acrylate copolymer made by DuPont.

Surlyn 9320: Zinc neutralized ethylene-methacrylic acid-acrylate copolymer made by DuPont.

Himilan 1856: Sodium neutralized ethylene-methacrylic acid-acrylate copolymer made by DuPont-Mitsui Polychemicals Co., Ltd.

Himilan 1855: Zinc neutralized ethylene-methacrylic acid-acrylate copolymer made by DuPont-Mitsui Polychemicals Co., Ltd.

Surlyn 6320: Magnesium neutralized ethylene-methacrylic acid-acrylate copolymer made by DuPont.

Himilan 1601: Sodium neutralized ethylene-methacrylic acid copolymer made by DuPont-Mitsui Polychemicals Co., Ltd.

Himilan 1557: Zinc neutralized ethylene-methacrylic acid copolymer made by DuPont-Mitsui Polychemicals Co., Ltd.

Behenic acid: Produced by NOF Corporation under the trade name NAA-222S.

Calcium hydroxide: Produced by Shiraishi Industry Co., Ltd. under the trade name CLS-B.

TABLE 1

| | Example | | | | | | |
|---|---|---|---|---|---|---|---|
| | 1 | 2 | 3 | 4 | 5 | 6 | 7 |
| Composition (pbw) | | | | | | | |
| Component (a) | | | | | | | |
| Nucrel 1560 | | | | | | 20.0 | |
| Himilan 1605 | | | | | 10.0 | | |
| Himilan 1706 | | | | | 10.0 | | |
| Component (b) | | | | | | | |
| Nucrel AN4318 | | | | 20.0 | | | |
| Surlyn 8320 | 50.0 | | 40.0 | 40.0 | 40.0 | 40.0 | 50.0 |
| Surlyn 9320 | 50.0 | | 40.0 | 40.0 | 40.0 | 40.0 | 50.0 |
| Himilan 1856 | | 50.0 | | | | | |
| Himilan 1855 | | 50.0 | | | | | |
| Surlyn 6320 | | | 20.0 | | | | |
| Component (c) | | | | | | | |
| Behenic acid | 20.0 | 20.0 | 20.0 | 20.0 | 20.0 | 20.0 | |
| Calcium stearate | | | | | | | 20.0 |
| Component (d) | | | | | | | |
| Calcium hydroxide | 2.5 | 2.5 | 2.5 | 3.0 | 3.0 | 3.5 | 0.5 |
| Titanium dioxide | 2.0 | 2.0 | 2.0 | 2.0 | 2.0 | 2.0 | 2.0 |
| Resin properties | | | | | | | |
| Extrudability | good | good | good | good | good | good | good |
| Melt flow rate (dg/min) | 2.0 | 2.0 | 2.0 | 2.0 | 1.8 | 1.8 | 1.5 |
| Weight loss (wt %) | 0.7 | 0.6 | 1.0 | 0.6 | 0.6 | 0.6 | 1.5 |
| Relative absorbance of carboxylate peak | 1.8 | 1.9 | 1.8 | 1.9 | 2.0 | 1.9 | 2.0 |
| Cover hardness (Shore D) | 50 | 56 | 50 | 50 | 53 | 53 | 50 |
| Specific gravity | 0.97 | 0.97 | 0.97 | 0.97 | 0.97 | 0.97 | 0.97 |
| Ball properties | | | | | | | |
| Weight (g) | 45.2 | 45.2 | 45.2 | 45.2 | 45.2 | 45.2 | 45.2 |
| Hardness (mm) | 2.82 | 2.76 | 2.82 | 2.82 | 2.80 | 2.79 | 2.82 |
| Initial velocity (m/s) | 77.2 | 77.6 | 77.2 | 77.1 | 77.5 | 77.4 | 77.2 |

TABLE 2

| | Example | | | | | | |
|---|---|---|---|---|---|---|---|
| | 1 | 2 | 3 | 4 | 5 | 6 | 7 |
| Composition (pbw) | | | | | | | |
| Component (a) | | | | | | | |
| Nucrel 1560 | | | | | | | |
| Himilan 1605 | | | | 10.0 | 10.0 | 10.0 | 50.0 |
| Himilan 1706 | | | | 10.0 | 10.0 | 10.0 | |
| Component (b) | | | | | | | |
| Nucrel AN4318 | | | | | | | |
| Surlyn 8320 | 50.0 | 50.0 | 50.0 | 40.0 | 40.0 | 40.0 | |
| Surlyn 9320 | 50.0 | 50.0 | 50.0 | 40.0 | 40.0 | 40.0 | 50.0 |
| Himilan 1856 | | | | | | | |
| Himilan 1855 | | | | | | | |
| Surlyn 6320 | | | | | | | |
| Component (c) | | | | | | | |
| Behenic acid | | | | | | | |
| Calcium stearate | | 20.0 | | | 20.0 | | |
| Component (d) | | | | | | | |
| Calcium hydroxide | | | 2.5 | | | 3.0 | |
| Titanium dioxide | 2.0 | 2.0 | 2.0 | 2.0 | 2.0 | 2.0 | 2.0 |
| Resin properties | | | | | | | |
| Extrudability | good | good | poor | good | good | poor | good |
| Melt flow rate (dg/min) | 1.0 | 1.3 | — | 1.2 | 1.5 | — | 1.6 |
| Weight loss (wt %) | 0.5 | 2.8 | — | 0.5 | 2.8 | — | 0.5 |
| Relative absorbance of carboxylate peak | 1.1 | 1.7 | — | 1.0 | 1.6 | — | 0.6 |
| Cover hardness (Shore D) | 45 | 48 | — | 50 | 53 | — | 50 |
| Specific gravity | 0.97 | 0.97 | — | 0.97 | 0.97 | — | 0.97 |
| Ball properties | | | | | | | |
| Weight (g) | 45.2 | 45.2 | — | 45.2 | 45.2 | — | 45.2 |
| Hardness (mm) | 2.87 | 2.84 | — | 2.83 | 2.79 | — | 2.83 |
| Initial velocity (m/s) | 76.6 | 76.8 | — | 76.9 | 77.0 | — | 76.9 |

TABLE 3

| | Example | Comparative Example | |
|---|---|---|---|
| | 8 | 8 | 9 |
| Cover inner layer | | | |
| Composition (pbw) | | | |
| Component (b) | | | |
| Surlyn 8320 | 50.0 | 50.0 | 50.0 |
| Surlyn 9320 | 50.0 | 50.0 | 50.0 |
| Component (c) | | | |
| Behenic acid | | | |
| Calcium stearate | 20.0 | | |
| Component (d) | | | 20.0 |
| Calcium hydroxide | 2.5 | | |
| Titanium dioxide | 2.0 | 2.0 | 2.0 |
| Cover outer layer | | | |
| Composition (pbw) | | | |
| Himilan 1601 | 50.0 | 50.0 | 50.0 |
| Himilan 1557 | 50.0 | 50.0 | 50.0 |
| Titanium dioxide | 2.0 | 2.0 | 2.0 |
| Cover hardness (Shore D) | 60 | 60 | 60 |
| Specific gravity | 0.97 | 0.97 | 0.97 |
| Ball properties | | | |
| Weight (g) | 45.2 | 45.2 | 45.2 |
| Hardness (mm) | 2.85 | 2.89 | 2.87 |
| Initial velocity (m/s) | 76.7 | 76.2 | 76.5 |

The cover stocks of Examples 1 to 7 had superior resilience to the ionomer resin blend cover stocks of Comparative Examples 1, 4 and 7; superior resilience and thermal stability to the metal soap-modified cover stocks of Comparative Examples 2 and 5; and superior moldability to the highly neutralized ionomer resin cover stocks of Comparative Examples 3 and 6.

The three-piece solid golf ball of Example 8 using the cover stock of Example 1 as the intermediate layer had superior rebound to the three-piece solid golf balls of Comparative Examples 8 and 9 using the cover stocks of Comparative Examples 1 and 2 as the intermediate layer.

The golf ball material of the invention has good thermal stability, flow characteristics and moldability, and can be molded into a part exhibiting excellent rebound, ensuring the manufacture of golf balls with high performance. The golf balls of the invention having a molded part of the inventive golf ball material as a constituent component can be manufactured easily and efficiently, and have excellent rebound.

Japanese Patent Application No. 2000-379247 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball material comprising a mixture which is composed of:
    100 parts by weight of a base resin having consisting of (a) an olefin-unsaturated carboxylic acid binary random copolymer or a metal ion-neutralized olefin-unsaturated carboxylic acid binary random copolymer or both, blended with (b) an olefin-unsaturated carboxylic acid-unsaturated carboxylate ternary random copolymer or a metal ion-neutralized olefin-unsaturated carboxylic acid-unsaturated carboxylate ternary random copolymer or both, in a weight ratio of 20:80 to 30:70,
    (c) 5 to 80 parts by weight of a fatty acid or fatty acid derivative or both, having a molecular weight of 280 to 1,500; and
    (d) 0.1 to 10 parts by weight of calcium hydroxide.

2. The golf ball material of claim 1, wherein the mixture when molded has a Shore D hardness of 30 to 60.

3. The golf ball material of claim 1, wherein the mixture has a melt index of 0.5 to 20 dg/min.

4. The golf ball material of claim 1, wherein the metal ion-neutralized random copolymer in said base resin comprises a zinc ion-neutralized ionomer resin.

5. The golf ball material of claim 1, wherein the total content of random copolymers and the total content of metal ion-neutralized random copolymers in said base resin are in a weight ratio of 0:100 to 60:40.

6. The golf ball material of claim 1, wherein component (c) is at least one member selected from the group consisting of stearic acid, behenic acid, arachidic acid, lignoceric acid and derivatives thereof.

7. A golf ball comprising a molded part of the golf ball material according to claim 1.

8. The golf ball material of claim 1, wherein the kinds of the metal of the component (b) is two and more.

9. The golf ball material of claim 1, wherein a zinc and a sodium are used as the metal of the component (b).

10. The golf ball material of claim 1, wherein the component (c) has a molecular weight of 300 to 1,500.

11. The golf ball material of claim 1, wherein the mixture further comprises an antioxidant.

12. The golf ball material of claim 11, wherein the antioxidant is present in an amount of 0.1 to 10 parts by weight per 100 parts of the components (a), (b), (c) and (d).

13. The golf ball material of claim 1, wherein the mixture further comprises a non-ionomer thermoplastic resin.

14. The golf ball material of claim 13, wherein the non-ionomer resin may be selected from the group consisting of olefin elastomers, styrene elastomers, polyester elastomers, urethane elastomers and polyamide elastomers.

15. The golf ball material of claim 13, wherein the non-ionomer resin is present in an amount of 1 to 100 parts by weight per 100 parts by weight of the components (a), (b), (c) and (d).

16. The golf ball material of claim 1, wherein the material has a carboxylate stretching vibration peak absorbance that is at least 1.3 times the carbonyl stretching vibration peak absorbance.

17. The golf ball material of claim 1, wherein the material has a weight loss at 250° C., based on the weight of the mixture at 25° C., of not more than 2% by weight.

* * * * *